No. 802,945. PATENTED OCT. 24, 1905.
I. G. WATERMAN.
ELECTROMAGNETIC VALVE.
APPLICATION FILED JUNE 25, 1903.
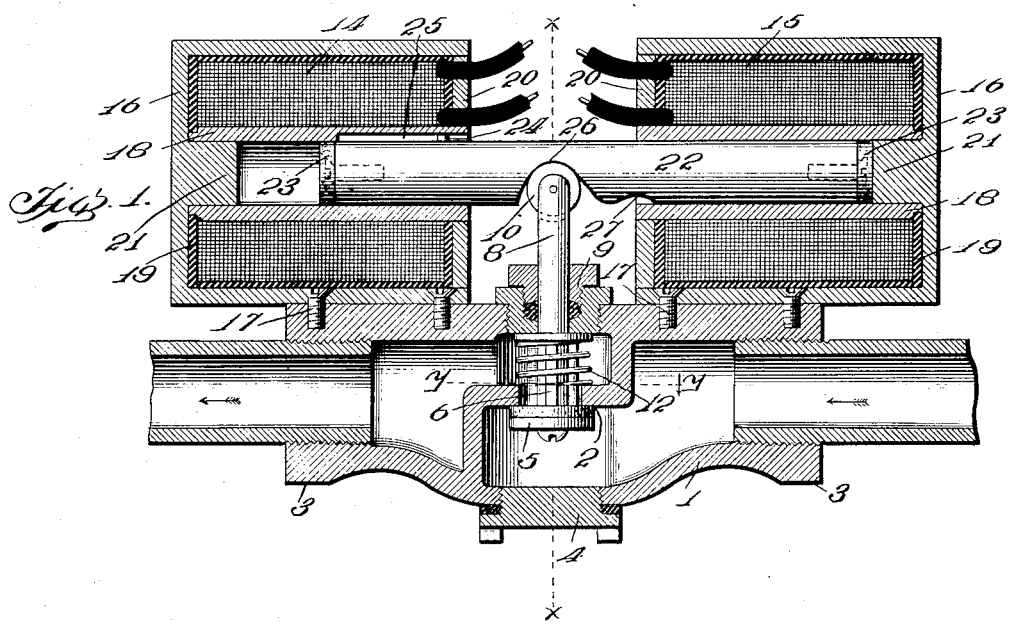
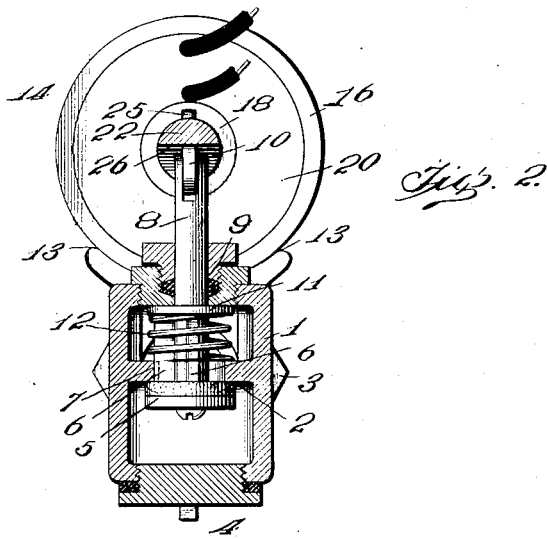
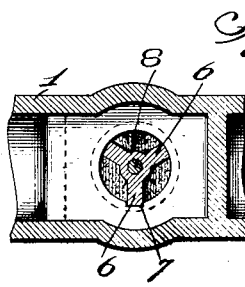
Witnesses
Elmer Leavey
Sarah V. Lockwood
Inventor
Isaac G. Waterman
by Geo. W. Hamlin
his Attorney

UNITED STATES PATENT OFFICE.

ISAAC G. WATERMAN, OF SANTA BARBARA, CALIFORNIA.

ELECTROMAGNETIC VALVE.

No. 802,945.  Specification of Letters Patent.  Patented Oct. 24, 1905.

Application filed June 25, 1903. Serial No. 163,125.

*To all whom it may concern:*

Be it known that I, ISAAC G. WATERMAN, a citizen of the United States, residing at Santa Barbara, in the county of Santa Barbara and State of California, have invented new and useful Improvements in Electromagnetic Valves, of which the following is a specification.

This invention relates to electromagnetic valves.

In my copending applications, Serial Nos. 146,975 and 146,976, I have shown electromagnetically-opened self-closing valves operating on a temporary current, together with electomagnetically-retracted locking means for holding the valves open until another temporary current is sent through the unlocking-coil.

In the present invention my object is to provide an improved electromagnetic valve in which the valve-operating armature will not be exposed to the rusting action of the water and one which will be of neat appearance and compact arrangement, of few parts, durable, positive, and reliable in its opening, locking, and closing actions, and not liable to get out of order. In the present invention I propose to make the valve self-closing, accomplish opening thereof and automatic locking by temporary magnetic action, and induce closing of the valve by the release thereof by temporary magnetic action.

The invention resides more particularly in a novel arrangement of electromagnets and their action on the same armature, as well as the peculiar construction of the armature and its manner of coöperation with the self-closing valve, as clearly set forth hereinafter.

The novel features are recited in the appended claims.

In the accompanying drawings, Figure 1 is a sectional side elevation. Fig. 2 is a cross-section on line X X of Fig. 1; Fig. 3, a detail section on line y y of Fig. 1.

The valve-casing 1 is of an ordinary type and has the valve-seat 2. The usual pipes screw into the ends of the valve-casing. At the ends of the valve-casings are the integral nuts 3 for convenience in screwing the pipes and casing together, and in its bottom the valve-casing has a removable screw-plug 4, closing an opening through which the valve 5 can be conveniently inserted into or removed from the valve-casing. The valve 5 seats against the bottom of the seat 2 and is provided with the usual wings or vanes 6, one of which is received in a notch 7 in the valve-seat, whereby the valve is prevented from turning. The valve-stem 8, which is rigid with the valve, works through the glands 9 and is provided at its upper end with an antifriction-roller 10. The valve-stem has a collar 11, between which and the top of seat 2 is a coil-spring 12, whose tendency is to seat the valve. The upper end portions of the valve-casing are provided with integral curved transversely-disposed magnet-seats 13.

There are two electromagnets 14 and 15 of the solenoid type, which have cylindrical outer iron shells 16 seated in the respective seats 13 and secured by the screws 17, Fig. 1. The magnets are thus held securely against lateral and longitudinal displacement with their hollow centers in alinement. The solenoids are wound on brass shells 18 and are suitably insulated at 19. Removable heads 20 are also provided. On the shells 16 are central stubs or projections 21.

The armature 22 slides in the shells 18 and has sound-deadening buffers 23 at its ends, which are adapted to strike against the projections 21 at the two limits of the movement of the armature. On the armature is a pin or lug 24, which plays in a guideway 25 in the left-hand shell 18 and prevents turning of the armature. The lower part of the armature has a large notch 26 and a small locking-notch 27 at the side of said notch. One or the other of these notches is adapted to receive the roller 10, according to the position of the armature.

Assuming that the parts are in the position shown in Fig. 1, the valve is then held against its seat by the spring. On sending a current through the coil 14 the armature is drawn thereinto, thus depressing the valve-stem and valve. The buffer strikes the projection 21 on the shell of magnet-coil 14, and the roller 10 passes meanwhile from the deep notch 26 into the shallow locking-notch 27, where it remains, keeping the valve open until a current is sent through the coil 15, whereupon the armature is drawn back into the position shown in Fig. 1, allowing the roller 10 to enter notch 26 and the spring to seat the valve again. It will be understood that a temporary current only need be sent through either coil, and to do this a suitable switch, such as those set forth in certain of my copending applications, can be employed, although other switches might be used for this purpose.

Having thus described my invention, what

I claim as new, and desire to secure by Letters Patent, is—

1. In an electromagnetic valve, the combination with a valve, of means for seating said valve when said valve is freed, an armature coöperating with the valve and causing opening and closing of the valve on successive movements, and independent electromagnets controlling said armature and arranged to independently actuate it to different positions to independently cause opening and closing of the valve.

2. In an electromagnetic valve, the combination with a valve, of means adapted to seat said valve when freed, an armature movable to different positions, independent electromagnets independently controlling said armature to independently move it to different positions, and an operative connection between the armature and valve, comprising a cam on one of them and a member coöperating with the cam, on the other of them.

3. In an electromagnetic valve, the combination with a spring-actuated valve, of an armature having a cam and a depression coöperating with the valve, the depression permitting the valve to close and the cam being adapted to open the valve against its spring-closing tendency, and independent electromagnets independently controlling said armature to independently move it to different positions to open and close the valve.

4. In an electromagnetic valve, the combination with a valve-seat, and a reciprocating valve adapted to rest on said valve-seat, of a spring coöperating with the valve to actuate it in one direction, an armature movable to different positions and having a depression coöperating with the valve to permit the spring to actuate said valve and also having a cam coacting with the valve to operate the valve against the tendency of the spring, and independent electromagnets independently controlling the armature to independently move it to different positions to open and close the valve.

5. In an electromagnetic valve, the combination with a valve-seat, of a reciprocating valve adapted to rest on said seat and having a stem, a spring coöperating with the valve to close it, a roller carried by the stem, independent solenoids adaptable for independent energization, and an armature adapted to play back and forth in the solenoids under the independent influences thereof and having a notch to receive the roller to permit closing of the valve by the spring and also having a cam coöperating with the roller to unseat the valve.

6. The combination with independent alined solenoids, of an armature movable in said solenoids and having a cam-notch and a locking-notch, a valve, a valve-stem, a spring adapted to project the valve-stem into the notches, whereby attraction of the armature by one solenoid moves the valve-stem against the tension of the spring and causes it to snap into the locking-notch thereby holding the valve open, and operation of the other solenoid permits the valve-stem to return into the cam-notch and the valve to close by the action of the spring.

In testimony whereof I have signed my name to this specification in the presence of two subscribing witnesses.

ISAAC G. WATERMAN.

Witnesses:
WALLACE R. SEAVEY,
ELMER SEAVEY.